Oct. 25, 1932.   LA VAUGHN L. MORTESEN   1,884,117
CONTROL SWITCH
Filed May 9, 1930     2 Sheets-Sheet 2
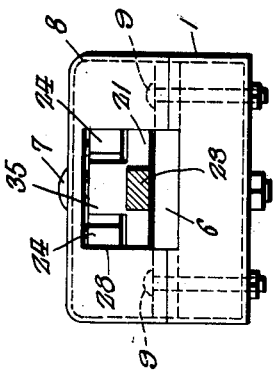
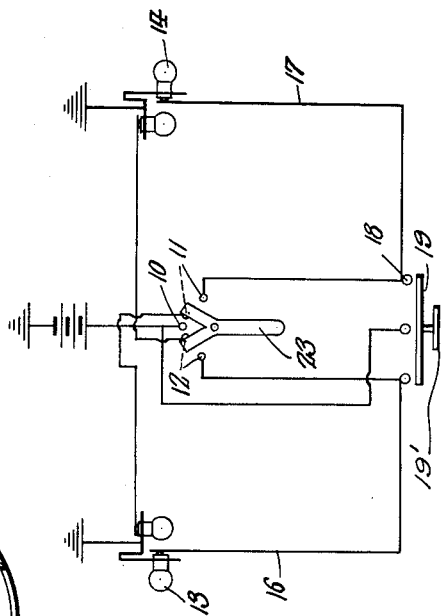
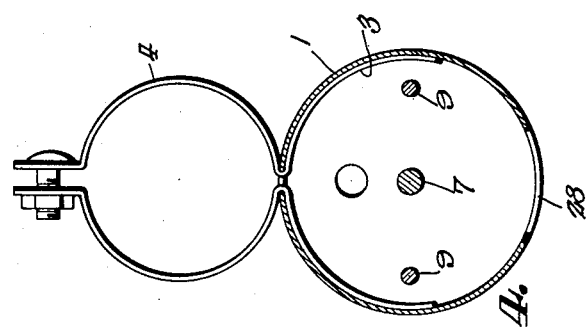
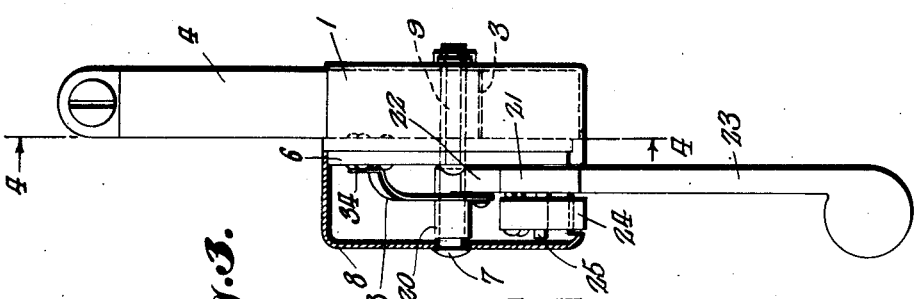
LaVaughn L. Mortesen,
INVENTOR
BY Victor J. Evans
ATTORNEY Patented Oct. 25, 1932

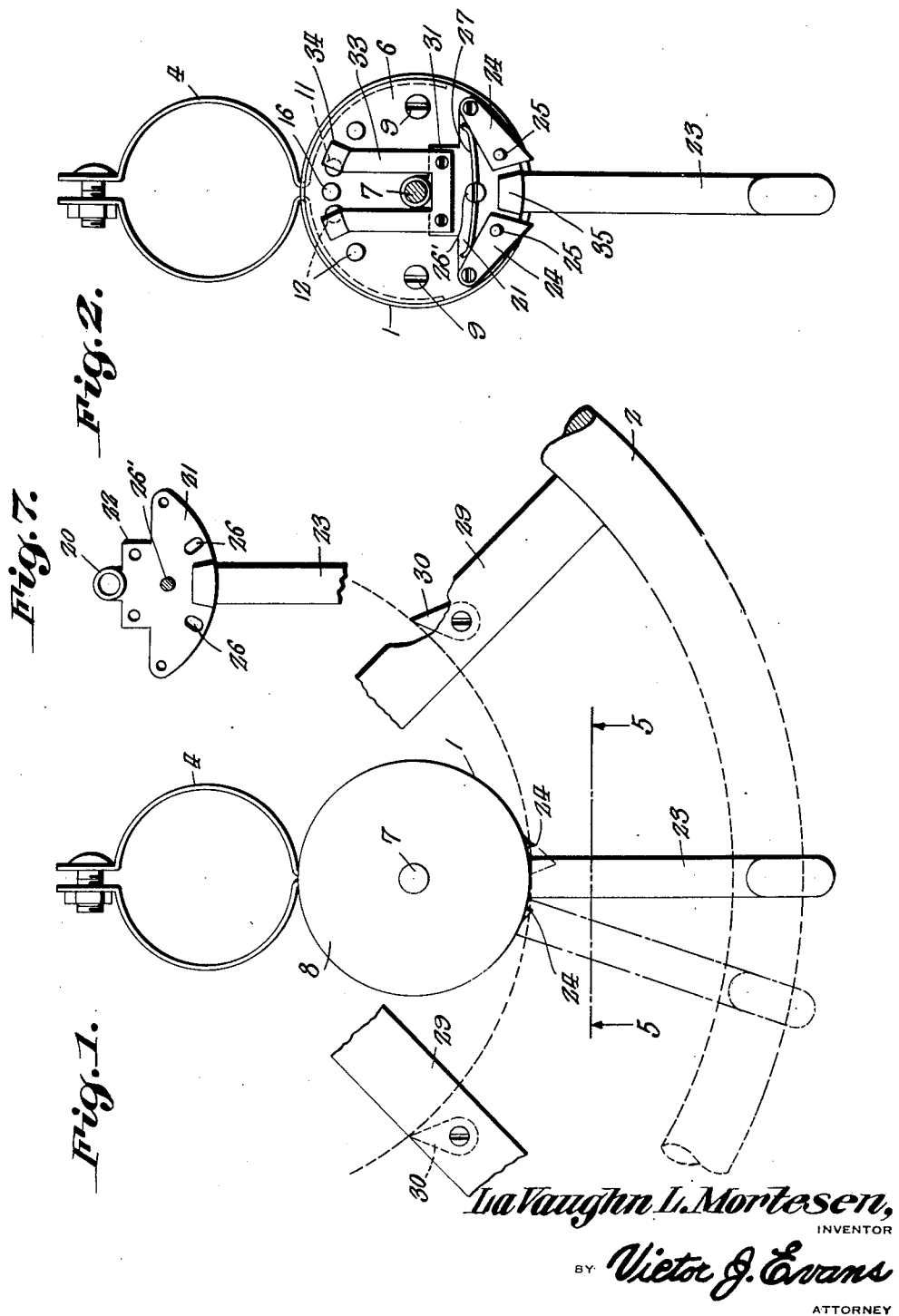

1,884,117

UNITED STATES PATENT OFFICE

LA VAUGHN L. MORTESEN, OF LOS ANGELES, CALIFORNIA

CONTROL SWITCH

Application filed May 9, 1930. Serial No. 451,122.

My present invention has reference to a directional signal for automobiles or like vehicles, and is primarily directed to a switch for controlling the lights in the direction signals for such vehicles.

The principal object of the invention is the provision of a switch to be employed in connection with signals arranged upon the sides of the vehicle which is semi-automatic in operation, that is, a switch which is thrown by hand to illuminate the signals on either side of the vehicle and which automatically breaks the circuit to extinguish the lights when the steering wheel is turned to initial position.

A still further object is the provision of a switch for this purpose that shall be of a simple construction, easily arranged upon the steering post column of a vehicle, in a position whereby the same can be operated by the hand of the driver as well as thrown to neutral position by the turning of the steering wheel and which shall be positive in action.

To the attainment of the foregoing and other objects which will present themselves the invention consists in certain other novel features of construction, combination and operative association of parts. one satisfactory embodiment of which is disclosed by the accompanying drawings.

In the drawings:

Figure 1 is a top plan view of the improvement also illustrating a portion of the steering wheel of an automobile or like vehicle.

Figure 2 is a plan view of the improvement with the top of the casing removed.

Figure 3 is a side elevation thereof with parts broken away and parts in section.

Figure 4 is a plan view of the casing and the attaching plate, the casing being in section.

Figure 5 is a sectional view approximately on the line 5—5 of Figure 1.

Figure 6 is a diagrammatic view to illustrate the electric wiring.

Figure 7 is a plan view of the lever and the plate connected thereto.

In carrying out my invention I employ a cylindrical casing 1. The casing is small so that the same can be conveniently arranged beneath the steering wheel 2 of an automobile or like vehicle. The casing has an opening in what I will term its rear face through which are received the arched spring arms 3 of a two-part cylindrical clip 4 designed to be arranged around and to be removably secured to the steering post of the vehicle. The casing has its bottom provided with an opening for the reception of the circuit wires and has arranged therein a disc 6 of insulating material. A pivot bolt 7 passes centrally through the disc and through the casing and the said bolt secures on the casing the removable top or closure 8. In addition to the bolt 7, which, of course, is engaged by a nut, other bolts 9 pass through the disc 6 and through the bottom of the casing 1, the said bolts being engaged by suitable nuts. These bolts secure in the casing a plate or disc which carries contacts, five in number, the central contact for distinction being indicated by the numeral 10, and those at the opposite sides of the said central contact by the numerals 11—11 and 12—12, respectively.

By reference to Figure 6 of the drawings it will be seen that the central contact 10 is wired in a battery circuit and that the side contacts 11—11 and 12—12 are wired to lamp bulbs 13 and 14 which are arranged in signal housings that are disposed to the opposite sides of the vehicle. A detail description of the signals will not be attempted in this description, as the same forms the subject matter of an application for U. S. patent filed May 9, 1930, and bearing Serial No. 451,123. Also by reference to Figure 6 of the drawings it will be noted that the wire leading from the battery has a branch that merges into a contact or terminal 15 and that the wires 16 and 17 leading from the lamp bulbs have contacts 18 that are in the path of engagement of a switch or contact plate 19 which is designed to be moved by and with the brake pedal lever 19' of the automobile and which is movable against the contacts 18 when the lever is shifted to apply the brakes.

Journaled on the bolt 7 there is a sleeve element 20 disposed on one end of a segmental plate 21. The plate 21 has its inner and straight end formed with an extension 22 on whose outer end the sleeve 20 is formed. The segmental plate 21 carries an outstanding centrally arranged lever 23. The corners of the segmental plate 21 have pivotally secured thereto block elements which I will term dogs and which are indicated by the numeral 24 in the drawings. Each dog carries a pin 25 designed to travel through an arcuate slot or opening 26 in the segmental plate 21. The segmental plate 21 is approximately centrally provided with a stud 26' to which is centrally secured an arched spring 27 and the ends of this spring contact with the inner edges of the dogs 24 for thrusting or forcing the dogs outwardly when the lever arm is moved to one position and for holding the dogs retracted as shown by Figure 2 of the drawings.

The top or cover of the casing has an opening 28 through which the lever 23 passes and through which opening the widened and outer ends of the dogs 24 are received.

On two of the spokes 29 of the steering wheel 2 there are pivotally secured contact elements in the nature of pawls 30 which are preferably spring influenced in one direction and these pawls are arranged to contact with the dogs 24 when the said dogs are projected through the openings 28 in the casing.

There is secured on the rectangular inner portion 22 of the segmental plate 21 a block 31 of insulating material and to this block there is fixed a pair of downwardly arched spring metal arms 33 which have straight outer ends 34, and these ends are in the path of engagement with the contacts 10, 11—11 and 12—12. It is, of course, to be understood that the contacts are wired in the signal circuit.

The lever 23 has a boss or enlargement 35 disposed between the confronting faces of the dogs 24 which tends to fill the opening in the casing.

The operation of the improvement may be briefly described as follows: When the driver of the vehicle decides to make a turn or to stop he can press his foot upon the brake pedal to move the contact or switch plate 19 to engage with the contacts 18 to complete the circuit through the lamp bulbs 13 and 14. The brake pedal operated contact 18 on the switch 19 is merely an additional or auxiliary means for illuminating the bulbs. Should the driver take a turn to either the right or left hand side of a street or road with the brake pedal released and the contact plate 19 brought away from the contacts 18, he manually operates the lever 23 which, of course, will turn the segmental plate 21 and swing the ends 34 of the arched contact or spring members 35 into engagement with the contacts 10, 11—11 or 12—12. This will, of course, illuminate the signals and will warn traffic both ahead and to the rear of the vehicle of the driver's intention. This also will cause one of the dogs 24 to be projected through the opening 28 in the casing and will bring the projecting end thereof into the path of contact with one of the pawls 30 on the steering wheel 2. The turning of the steering wheel 2 will thus, through the medium of the contacting engagement of the pawl 30 with the dog 24, turn the switch to initial neutral position.

The construction of my improvement as well as the advantages thereof will, it is thought, be understood and appreciated by those skilled in the art to which such invention relates so that further detailed description will not be required. I desire to state, however, that I do not wish to be restricted to the precise details herein set forth and, therefore, hold myself entitled to make such changes therefrom as fairly fall within the scope of what I claim.

Having described the invention, I claim:

A circuit breaker for the purpose set forth, including a cylindrical casing having a clamp for fastening the same on the steering post column of an automobile or the like, and said casing comprising a cylindrical member, and having its outer side provided with an elongated slot, a block of insulating material in the casing and provided with contacts for wires in the electric circuit of an automobile and to bulbs in such circuit, a metal segmental plate having an inner reduced extension provided on its outer end with a central sleeve for a pivot that connects the plate to the block and to the casing, outwardly extending parallel metal spring arms secured to the reduced end of the segmental plate at the opposite sides of the sleeve and having a downwardly rounded portion terminating in straight ends which are engageable with the contacts, a handle fixed centrally to the segmental plate and extending through the opening in the casing and having a headed portion in a line with the periphery of the segmental plate, dogs pivoted to the inner corners of the segmental plate, and carrying pins, an arched spring centrally fixed to the segmental plate and exerting a pressure against the dogs to force the ends thereof through the opening in the casing, said segmental plate having arcuate slots therein for the reception of the pins on the dogs, and the dogs being so positioned that when the handle is turned to bring the spring contact fingers on the segmental plate into engagement with the fixed contacts that one of the dogs will have its end projected through the opening in the casing and the other will have its outer end guided into the casing, in combination with means for contacting the projecting dog for swinging the segmental plate to return the spring switch arms thereon to initial position.

In testimony whereof I affix my signature.

LA VAUGHN L. MORTESEN.